March 10, 1931.  E. E. WANICK  1,795,356
DEVICE FOR TESTING BEVEL GEARS
Filed Aug. 3, 1927    2 Sheets-Sheet 1
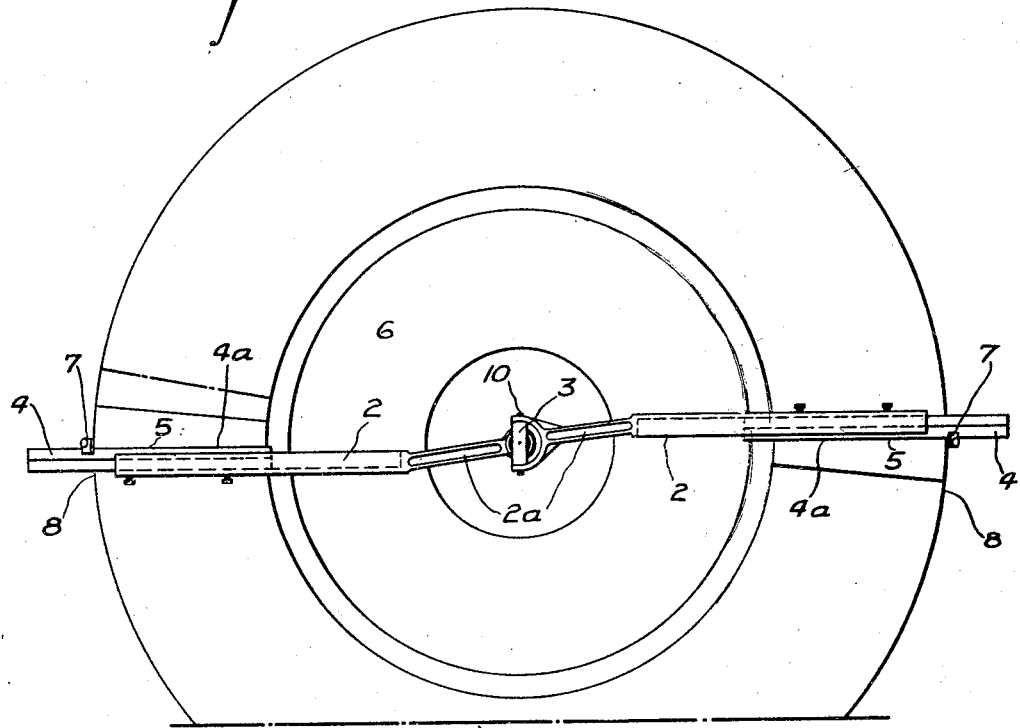
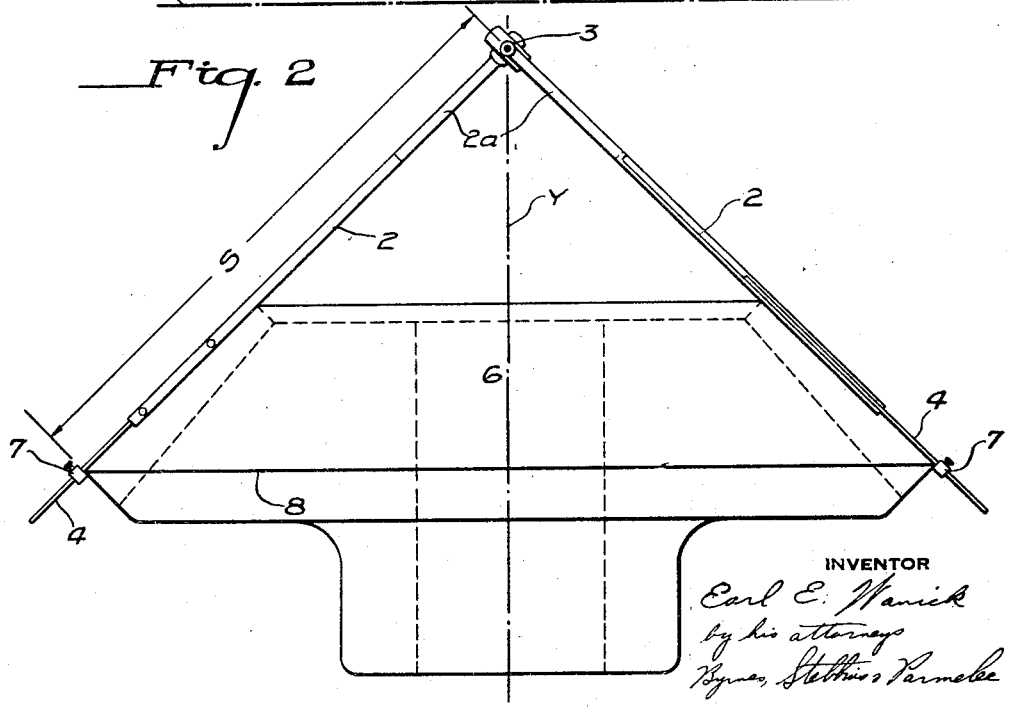
INVENTOR
Earl E. Wanick
by his attorneys
Byrnes, Stebbins & Parmelee March 10, 1931. E. E. WANICK 1,795,356
DEVICE FOR TESTING BEVEL GEARS
Filed Aug. 3, 1927 2 Sheets-Sheet 2
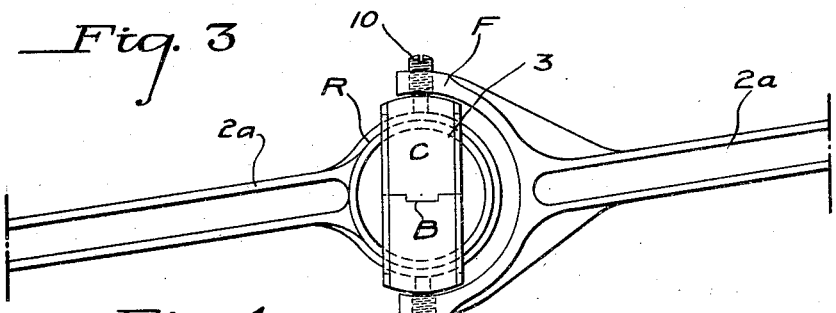
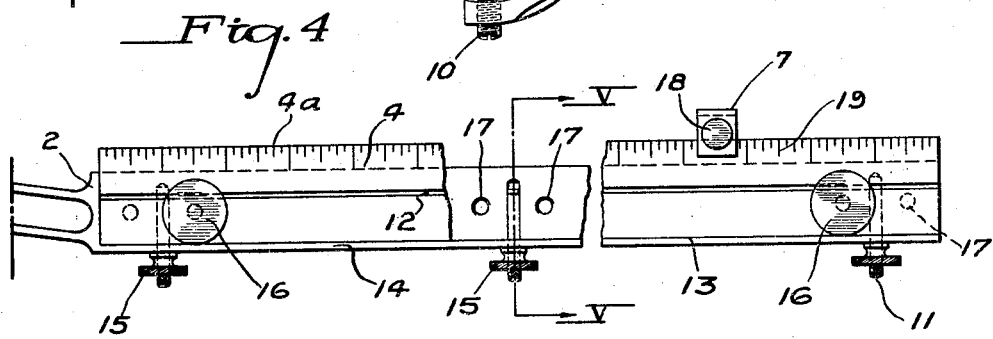
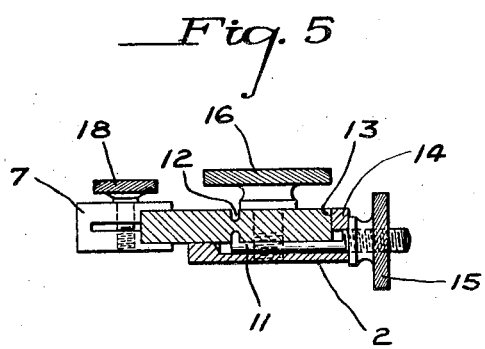
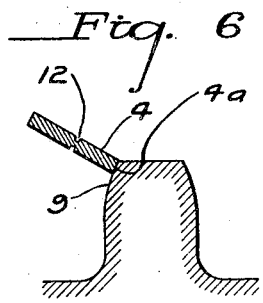
INVENTOR
Earl E. Wanick
by his attorneys Patented Mar. 10, 1931

1,795,356

UNITED STATES PATENT OFFICE

EARL E. WANICK, OF YOUNGSTOWN, OHIO, ASSIGNOR TO UNITED ENGINEERING & FOUNDRY COMPANY, OF PITTSBURGH, PENNSYLVANIA, A CORPORATION OF PENN-SYLVANIA

DEVICE FOR TESTING BEVEL GEARS

Application filed August 3, 1927. Serial No. 210,290.

This invention relates to a device for testing gears, and more particularly to a gauge for testing bevel gears.

This invention is particularly adapted for testing bevel gears during the process of manufacture, even though the gear blank be in place in a machine tool, such as a milling cutter or shaper. My improved gear tester is also applicable to formed gears.

My bevel gear testing device comprises a plurality of teeth engaging members adapted to lie along tooth surfaces. The tooth engaging members are supported by legs which are connected together by a universal joint, whereby the legs may be disposed at any desired angle to one another. The legs are further provided with stops adapted to engage the edge of the gear, the distance between the stops and the center of movement of the universal joint being equal to the cone distance of the gear.

In the accompanying drawings, illustrating the present preferred embodiment of my invention:

Figure 1 illustrates my gauge applied to a bevel gear blank;

Figure 2 is a side elevation of the gauge and blank shown in Figure 1;

Figure 3 is a detail view of the preferred universal joint connecting the legs;

Figure 4 is an enlarged view, to the same scale as Figure 3, showing the tooth surface engaging portion of the testing device;

Figure 5 is an enlarged sectional view on the line V—V of Figure 4; and

Figure 6 shows the tooth engaging portion lying against a finished tooth.

Referring to the illustrated embodiment there is shown in Figure 1, a bevel gear testing device comprising a pair of legs 2 connected by a universal joint 3. The legs 2 are provided with tooth surface engaging gauges 4 adapted to lie against tooth surfaces 5 formed on a gear blank 6. The gauges 4 are provided with stops 7 adapted to engage an edge 8 of the bevel gear.

The stops 7 are set on the gauges 4 at a distance S from the center of movement of the universal joint 3, the distance being equal to the cone distance of the particular gear to be tested. With the stops 7 so set, and the gauge applied to a gear blank, as shown in Figure 2, the center of movement of the universal joint 3 lies coincident with the axis Y of the gear.

In applying the gauge, at least two tooth surfaces are cut on the gear blank 6, the stops 7 are set on the gauges 4 at a distance S from the universal joint equal to the cone distance of the gear, and the gauges 4 are pressed against the tooth surface with the stops 7 pressed against the cone 8 of the gear blank 6. If the tooth surfaces 5 are cut at the proper angle so that they intersect the axis Y of the gear, the gauges 4 contact evenly with the teeth throughout their length. If the tooth surfaces 5 are not cut truly radial, one of the gauges will engage either the inner or outer edge of the tooth surface, but will not contact evenly with the tooth surface throughout its length. This will be due to the universal joint being thrown to one side of the axis Y.

It will be noted that the legs 2 are connected to the universal joint by connecting members $2^a$ which are disposed at an angle to the legs 2 whereby the edges $4^a$ of the gauges 4 are caused to lie along radial lines intersecting at the center of movement of the universal joint 3. The distance through which the legs $2^a$ are offset is determined by the width of the gauges 4.

By reason of the universal connection of the legs 2, the tooth engaging edges $4^a$ of the gauges 4 always lie in planes which intersect the center of movement of the universal connection. Thus the legs 2 may be disposed at any convenient angle to one another and the edges $4^a$ will define radial lines to which the tooth surfaces should conform. My gauge is therefore applicable to odd or even toothed gears and to various portions of the same gear, and is not limited to an application as shown in Figure 1, in which the tested tooth surfaces lie diametrically opposite one another.

Figure 6 shows a tooth surface 9 with the gauge 4 applied thereto at an angle. The gauge may be readily turned to any desired angle by reason of the universal connection at 3. This provision makes it possible to adjust the gauge readily to any convenient position where discrepancies between the gauge and the tooth surface may be most easily ascertained. If the lighting permits, it is possible to note variations from the correct tooth angle by mere inspection. If the shop be poorly lighted at the place where the test is being conducted, a small lamp may be inserted beneath the gauge and any light showing between the gauge and the tooth surface indicates a variation from the true position. Thickness gauges may also be used to determine the variation.

The preferred universal connection is illustrated in Figure 3, in which there is shown the connecting member 2$^a$ terminating, the one in a fork F and the other in a ring R. The ring R is given a ball turn so that its surface defines a portion of a sphere. Cooperating with the ring R is a clamp ring C, the inner surface of which defines a portion of a sphere the same size as the sphere conformed to by the outer surface of the ring R. The clamp ring C is held in contact with the ring R by pivot screws 10 threaded through the arms of the fork F and passing through the ring C. The clamp ring C is split in order to provide ready assembly, any convenient break, such as indicated at B, being provided to insure an accurate assembly. The clamp ring C is free to pivot about a line drawn through the axes of the pivot screws 10; and the ring R is free to turn through any angle inside the spherical bearing of the clamp ring C. The limiting angle between the connecting portions 2$^a$ and legs 2 is determined only by the point at which the various portions interfere when the legs are turned, and it will be apparent from the drawings that almost any desired angle is obtainable with the joint described. It will be understood, however, that other forms of universal joint may be employed if desired.

The gauge 4 is attached to the leg 2 by means of hook bolts 11 which cooperate with grooves 12 in the gauge 4. The hook bolts, inserted in the groove 12, draw the gauge tightly against a finished edge 13 formed on a flange 14 on the leg 2, thumb nuts 15 being provided to operate the hook bolts. After the gauge 4 has been drawn tightly against the finished edge 13 by means of the hook bolts 11, thumb screws 16 serve to clamp the gauge tightly against the leg 2 and prevent slippage. The thumb screws 16 cooperate with threaded holes 17 positioned in the legs 2 a desired distance from the universal joint 3 so that when the thumb screws 16 are tightened, the gauge is definitely positioned with respect to the universal joint.

The stop 7 is preferably in the form of a clamp, as shown in Figure 5, and is secured to the gauge 4 by simply tightening a thumb screw 18 which springs gripping portions of the stop into firm contact with the gauge. The stop 7 is positioned on the gauge a desired distance from the universal joint 3 by means of a scale 19 marked along the edge of the gauge with which the stop 7 cooperates. By reason of the accurate positioning of the gauge 4, by means of the thumb screws 16, it is possible to set the stop 7 at a desired distance from the universal joint by noting the position of the stop 7 with respect to the graduations 19 on the gauge 4. It will be noted that there are a number of holes 17 provided in the leg 2, whereby the gauge 4 may be clamped at various positions along the leg 2, thereby providing a gauge adapted for various sizes of gears and gears of various cone angles.

In applying my gauge, it is not necessary that a number of teeth be cut, for as shown in Figure 6, the tooth surface contacting gauge may be tilted by reason of the universal connection between the legs 2, and a comparatively shallow cut is sufficient to enable the operator to determine whether or not the machine tool operating upon the blank is cutting the teeth at the proper angle. As hereinbefore described, the legs may be set at any angle with respect to one another, so that it is not necessary that the teeth on the partially formed blank which is being tested need be diametrically opposite or even approximately so. My gauge is as readily adapted for testing completely finished gears as for checking gear blanks upon which partially finished tooth surfaces have been cut.

My gauge may be readily applied to gear blanks held in a machine tool so that the setting of the tool may be checked without removing the work from the tool. The testing device is so designed that the tooth surface engaging edges 4$^a$ of the device always lie along lines which intersect at the center of movement of the universal joint. It is possible, therefore, to turn the legs to any desired angle to engage tooth surfaces, and rotate the legs, as shown in Figure 6, without causing any deviation of the gauging edges from true radial planes intersecting along a line which includes the center of movement of the universal joint 3. By properly positioning the stops 7 to the cone distance of any particular gear, it is possible to quickly and accurately determine whether or not the tooth angles of the gear, or partially finished gear, are correct, and the tooth surfaces truly radial. Moreover, either one or both of the legs may be turned completely over so that the gauge may be used in the position illustrated, in a position the reverse of the position illustrated in which the engaging edges engage the opposite sides of the teeth, or in a position in which either one of the legs is turned over and the remaining leg engages the side of the tooth illustrated while the other leg engages the opposite side of another tooth.

The device is described as being for the purpose of testing bevel gears, but the term bevel gears as herein used, shall be understood to include other articles and particularly articles of this general character and variously designated "cone gears", "angle gears", "cone ratchets" and the like.

While I have illustrated and described the present preferred embodiment of my invention, it will be understood that it is not limited thereto, but that the invention may be otherwise embodied within the scope of the following claims.

I claim:

1. In a bevel gear testing device, a plurality of legs, a universal joint connecting the legs, each leg being adapted to describe the cone of which the surfaces of the bevel gear are a part while the other leg is prevented from rotating, a gauging edge on each leg, each of said gauging edges being adapted to contact with a tooth surface, and a stop carried by each leg, whereby the pivot point of the legs is positioned with respect to an edge of the gear.

2. In a device for testing bevel gears, a plurality of legs, a universal joint connecting the legs, the legs being adapted to describe the cone of which the gear teeth are a part, a gauging edge carried by each leg and adapted to contact with the toothed surface of the gear, the ends of the legs adjacent their pivot points being disposed at an angle to the other ends of the legs whereby each gauging edge is positioned in a line which extends through the center of movement of the universal joint.

3. In a bevel gear testing device, a plurality of legs, means for universally connecting the legs, a gauging edge on each of the legs, said gauging edges being disposed along lines which intersect the center about which universal movement of the legs is effected, and a stop movable along each of the gauging edges.

4. In a bevel gear testing device, a plurality of legs, means for universally connecting the legs, said means allowing the legs to be spread at an angle of more than 90°, a gauging edge on each of the legs, said gauging edges being disposed along lines which intersect the center about which universal movement of the legs is effected, and a stop movable along each of the gauging edges.

5. In a bevel gear testing device, a plurality of pivoted legs, each leg having a guiding edge therealong, a gauge for each guiding edge, said gauges having indicia thereon, means for holding each gauge in cooperative relationship with its guiding edge, means for holding each gauge on its leg at a predetermined distance from the pivot point of the legs, and a stop member on each gauge for cooperation with the indicia therealong.

6. In a bevel gear testing device, a plurality of legs, means for universally connecting the legs, a gauging edge on each of the legs, said gauging edges being disposed along lines which intersect the center about which universal movement of the legs is effected, and a stop movable along each of the gauging edges, said legs being rotatable about their longitudinal axes, whereby a gear blank having only a shallow cut may be tested.

In testimony whereof I have hereunto set my hand.

EARL E. WANICK.